July 4, 1967  DE LANE D. PATTON  3,329,453
JOINT FOR STEERING LINKAGE ARM OR THE LIKE
Filed Feb. 13, 1964
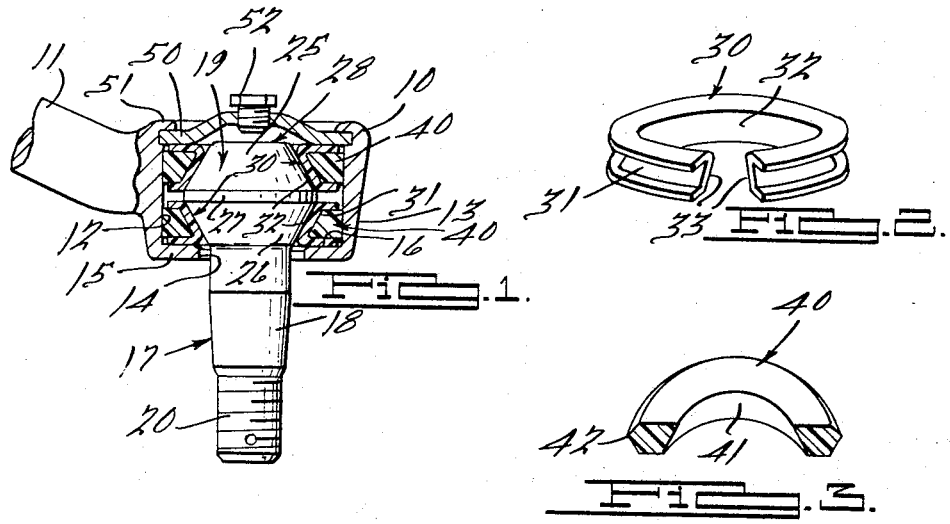
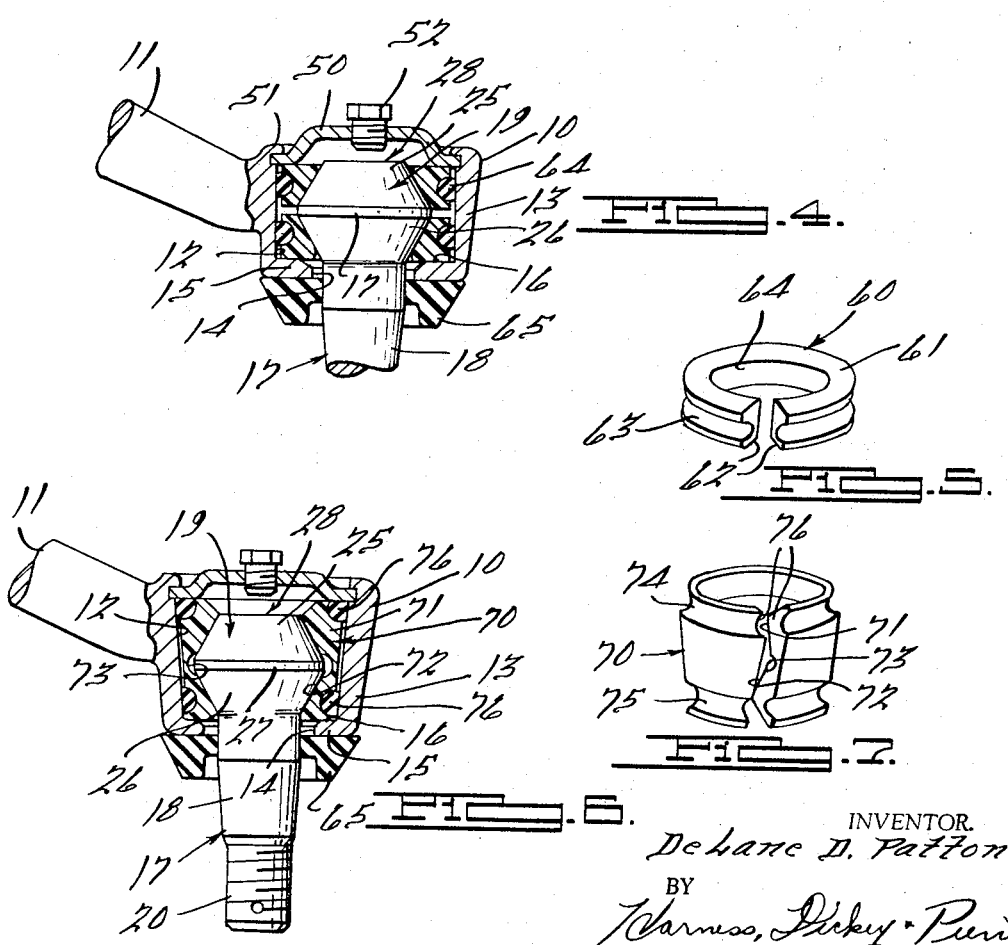
INVENTOR.
De Lane D. Patton
BY
Harness, Dickey & Pierce
ATTORNEYS

3,329,453
JOINT FOR STEERING LINKAGE ARM OR THE LIKE
De Lane D. Patton, Worthington, Ohio, assignor to The Columbus Auto Parts Company, Columbus, Ohio, a corporation of Ohio
Filed Feb. 13, 1964, Ser. No. 344,729
5 Claims. (Cl. 287—90)

This invention relates to flexible joints and particularly to a joint adapted for use in automotive vehicle steering linkages or the like.

It is an object of the present invention to provide a joint adapted for use with an idler arm or other steering linkage component and which incorporates a stud capable of rotational movement and limited oscillatory movement or inclination of the stud axis.

It is another object of the present invention to provide a flexible joint of the above character in which the stud is supported by bearings which grip the stud with a force sufficient to require the application of a specified torque to produce rotation of the stud and in which said gripping action is maintained throughout the life of the joint despite wear of the parts of the joint.

It is another object of the present invention to provide a flexible joint of the above character in which a large bearing area is provided between the stud and the bearings therefor to minimize the degree of wear of the parts and to maintain a high amount of effective gripping contact of the stud.

It is still another object of the present invention to provide a flexible joint of the above character which is able to absorb a certain amount of road shock and vibration to prevent the transmission of the same through the steering system.

It is still another object of the present invention to provide a flexible joint which is of rugged, sturdy construction, which may be inexpensively fabricated, which possesses a long, useful life and which may be used for long periods of time without the necessity of lubrication.

The various objects and advantages, and the novel details of construction of three commercially practical embodiments of the invention, will become more apparent as this description proceeds, especially when considered in connection with the accompanying drawings, in which:

FIGURE 1 is a longitudinal sectional elevational view through a joint constructed in accordance with this invention;

FIGURE 2 is a perspective view of one of the bearing or seat members;

FIGURE 3 is a sectional perspective view of one of the compression members;

FIGURE 4 is a view similar to FIGURE 1 of a modified form of construction;

FIGURE 5 is a perspective view of one of the bearing or seat members employed in the form of construction shown in FIGURE 4;

FIGURE 6 is a view similar to FIGURE 1 of another modified form of construction; and FIGURE 7 is a perspective view of the bearing or seat member employed in the form of construction shown in FIGURE 6.

Referring now particularly to FIGURES 1, 2 and 3, one form of the present invention will be described in detail. The flexible joint of this form of the invention comprises a housing 10 which may be, and preferably is, manufactured from forged steel and is shown as being provided with an integrally formed arm 11, which may comprise a portion of an idler arm or other steering linkage part. The housing 10 is formed with a cavity 12 defined by a cylindrical enclosing side wall 13. The cavity 12 is adapted to be closed at its upper end, by means yet to be described, but is provided at its other end with an aperture or opening 14 surrounded by a flange 15 forming an annular shoulder 16 which is exposed to and forms one end of the cavity 12. As initially forged, the upper end of the housing is open.

The reference character 17 indicates a headed stud formed with a stud portion 18 and a head 19 at one end. The stud 17 is adapted to be connected to a pitman arm or rod or other steering linkage (not shown), and is threaded as indicated at 20 to receive a nut or other fastening element to secure the steering linkage part on the stud 17.

The head 19 is formed with a pair of opposed frusto-conical surfaces 25 and 26 which may be, and preferably are, spaced apart in a direction axially or longitudinally of the stud 17. The frusto-conical surfaces 25 and 26 are arranged in radially outwardly converging relation and, if axially spaced, provide a narrow annular wall 27 therebetween. The stud 17 is provided with a flat circular end wall 28.

The object of this invention and the ultimate utility of the joint are best obtained if the conical surfaces 25 and 26 are disposed at an angle of approximately 30° to the longitudinal axis of the stud. This particular angle gives a maximum amount of bearing surface for a given size housing. Furthermore, this angle affords excellent resistance to and absorption of both axial and lateral impact or radial movement of the stud. Insofar as applicant is advised, it is believed that a stud head having conical surfaces disposed at an angle greater than 60° to the stud axis would be ineffective to adequately resist side thrust and properly distribute the force of an axial impact. Thus, it will be seen that the objects and advantages of this invention are best obtained by disposing the radially outwardly converging axial surfaces 25 and 26 at an acute included angle to the longitudinal axis of the stud. With such a construction, any axial impact on the head will be distributed in a ratio of two to one to the cavity side wall 13 and to the enclosure (yet to be referred to). This reduces the forces tending to destroy or knock out the closure member, which has heretofore been a problem.

The stud head 19 is positioned within the cavity 12, and in the form of the invention illustrated in FIGURES 1, 2 and 3, is engaged by a pair of substantially identical bearing or seat members 30.

Each bearing or seat member 30 is preferably formed of Delrin, nylon, or other low friction material which is preferably a synthetic resin compound. Each bearing or seat member 30 is in the form of a ring-like member provided with a radially outwardly facing channel 31 and a radially inwardly facing base or frusto-conical surface 32 adapted to engage one of the conical surfaces 25 or 26 of the stud member 17. The bearing or seat member 30 is preferably split transversely, as indicated at 33.

Each bearing or seat member 30 is held against its conical surface 25 or 26 by an annular compression or compressible member 40. Each compressible member 40 is in the form of an endless ring and is formed of rubber, neoprene, or other elastomeric material. Each compression or compressible member 40 is formed with a radially inner surface 41 which is substantially frusto-conical and complementary to the surface or base 32 of the bearing member 30. The outer surface or periphery of the compression member 40 is provided with a substantially V-shaped surface 42 adapted to engage the adjacent cavity wall 13 of the housing 10.

In assembling each compressible or compression member 40 with its seat member 30, the compression member is snapped over the seat member 30 into the channel 31 thereof. This brings the split ends 33 of the bearing member into abutting relation or into close proximity to one another. The V-shaped outer periphery 42 of each compression member 40 is flattened when the bearing member 30–40 is assembled with the stud in the housing 10 and the member 40 exerts a continuous inward pressure to exert a force against the bearing members 30 tending to force them radially inwardly against the conical surfaces 25 and 26 of the stud.

The bearing members 30–40 are held in engagement with the head of the stud between the shoulder 16 of the annular flange 15 on one end of the housing and a closure member 50, which is secured in place to close the open end of the housing by having the housing crimped or peening over, as indicated at 51.

It has been found that a bearing of this type may be initially lubricated upon assembly of the joint and will not thereafter require lubrication for a long period of usage. Such joints have heretofore been referred to in the art as "greaseless" or "permanently lubricated" joints. However, if desired, the closure 50 may be provided with a removable grease plug 52 so that additional lubricant may be introduced into the joint.

In assembling the joint, one of the compressible or compression members 40 is snapped into engagement with the channel 31 of the bearing member 30 and, as stated, this brings the split ends 33 into abutting relation or in close proximity to one another. The first assembled bearing member 30–40 is then inserted into the housing 10 against the shoulder 16. The stud is then inserted through the open end of the housing and the other bearing member 30–40 is then inserted into the housing. The compression of the compression or compressible members 40 causes the bearing members 30 to be forced against the stud head 19 and to firmly engage the conical surfaces 25 and 26 thereof, as will be apparent. An extra amount of compression is imparted to the compression members 40 by reason of the V-shaped surfaces 42 which engage the adjacent cavity wall 13 of the housing 10. Finally, the closure member 50 is secured in place by peening or crimping the housing thereagainst, as indicated at 51.

It will be readily understood that the bearing members 30–40 resist both axial and radial displacement of the stud. It will be understood that the stud 17 is held in place in such a manner by the bearings 30–40 that it may be rotated in position. However, the force with which the bearing members have gripped the head of the stud is such that a predetermined amount of torque will be required to rotate the stud 17. This is desirable in all steering linkage applications and, in fact, most automotive manufacturers specify that the studs be held with a force requiring a predetermined torque to produce rotation thereof. It is also desirable that this torque be maintained, to substantially the initial extent, throughout the useful life of the joint. For this purpose, the compression or compressible members 40 will expand to compensate for wear in the surfaces of the head 19 or the bearing or seat members 30, thus maintaining full contact with the conical surfaces 25 and 26 of the stud. It will thus be seen that any wear in the stud head 19 or the members 30 will not result in any loss of bearing contact between the stud head and the members 30 or in any substantial reduction in the gripping force applied to the stud head.

Angular inclination or adjustment of the longitudinal axis of the stud 17 relative to the normal position of said stud concentric with the axis of the cavity is possible. Movement is permitted by further compression of diametrically opposite compression members 40 and expansion of the other diametrically opposite compression members 40. While the joint of the present invention is not intended to permit substantial angular movement of the stud, the permissible inclination of the stud just described is sufficient for its intended use.

It is to be noted that the axial and radial forces exerted on the bearing or seat members 30 by the members 40 are effective to keep the bearings fully seated against the largest diameter portions of the adjacent head surfaces and are also resolved into forces normal to the conical head surfaces 25 and 26. This results in the full utilization of all of the available forces of the compression members 40 to grip the head of the stud. These forces are distributed over the large area provided by the conical surfaces 25 and 26 to reduce wear and increase the gripping effect. It is believed, therefore, that the construction of the present invention provides a uniquely efficient combination of parts which effectively accomplish the objects of this invention.

The modified form of the invention illustrated in FIGURES 4 and 5 will now be described. In FIGURE 4, the parts which are identical to the parts shown in FIGURE 1 are indicated by similar reference characters.

The split bearing or seat member 30 shown in FIGURE 2 may be conveniently formed by a single injection molding operation and in FIGURE 5, a similar type split bearing or seat member 60 is illustrated which may also be molded from Delrin, nylon, or other low friction material in a single injection molding operation. This bearing or seat member 60 comprises a split ring-like member 61 having split ends 62. The radially outer surface of the split ring member 61 is provided with a semicircular groove 63, and the radially inner wall 64 of the member 61 is inclined or frusto-conical in shape to engage the adjacent surface of one of the conical surfaces 25 or 26. An endless O-ring 64 of neoprene, rubber, or other elastomeric material is provided which is adapted to be snapped into the groove 63 in the member 60. This brings the split ends 62 of the member 60 into abutting relation or into close proximity to one another. The O-rings, which are normally circular in cross section, will be compressed when the seat member is inserted in the cavity 12 of the housing 10 and the side adjacent the housing 10 will become flattened so that the expanding forces of these O-rings will be exerted in a direction to urge the seat members 60 into firm contact with the conical surfaces 25 and 26 of the head 19 of the stud 17.

If necessary or desirable, a seal 65 of some suitable vinyl material may be provided on the stud 17 to seal the aperture 14.

In practically all respects, the joint illustrated in FIGURES 4 and 5 operates in the same manner and obtains the same advantages as described in connection with the form of invention illustrated in FIGURES 1 to 3.

Another modification of the invention is illustrated in FIGURES 6 and 7 and this will now be described. The same parts which appear in FIGURES 1 and 4 and which are duplicated in FIGURE 6 bear the same reference characters.

In this form of construction, the bearing or seat member 70 comprises spaced bearing or seat portions or members 71 and 72 joined together by a relatively thin or necked down portion 73. By forming the two bearing or seat members as a single or unitary construction, they may be economically produced by a single injection molding operation. As in the previously described constructions, the member 70 is preferably formed of Delrin, nylon, or other low friction material. The bearing or seat portions 71 and 72 are adapted to engage the conical portions 25 and 26 of the stud as in the previously described constructions. The upper end of the member 70 is provided with a semicircular groove 74 and the lower end of the member 70 is provided with a semicircular groove 75 adapted to receive an O-ring 76 formed of neoprene, rubber or other elastomeric material. In assembling the bearing or seat member, the O-rings 76 are snapped into the grooves 74 and 75 and this brings the split ends 76 of the member 70 into abutting relation or into close proximity to one another. As in the form of construction illustrated in FIGURES 4 and 5, the O-rings, which are normally circular in cross section, are compressed when the bearing or seat member 70 is inserted and thus become flattened against the cavity wall 13 of the housing 10.

The necked down or thinner portion 73 of the member 70 permits the bearing portions 71 and 72 to operate substantially independently of one another so that the joint shown in FIGURES 6 and 7 operates in a manner substantially similar to the previously described constructions and obtains all of the advantages thereof. This form of construction has the additional advantage that the member 70 may be produced by a single injection molding operation and may be assembled with the head 19 of the stud 17 more readily.

While three commercially practical embodiments of the invention have been described and illustrated herein somewhat in detail, it will be understood that various changes may be made as may come within the purview of the accompanying claims.

What is claimed is:

1. A flexible joint of the class described, comprising a housing having a cavity provided with an enclosing annular side wall and an opening at one end of said cavity, a stud extending through said opening and having an enlarged head disposed in said cavity so as to be spacedly surrounded by said wall, said head being provided with a pair of opposed generally conical surfaces tapering radially inwardly toward the opposite ends of the head, a pair of annular bearing member portions of resilient but substantially inelastic low friction bearing material surrounding and engaging said head surfaces with complementary converging surfaces and a pair of substantially annular elastomeric compression members each disposed between one of said bearing member portions and said wall, said bearing member portions each having a radial thickness equal to more than one-half the radial distance between the smallest diameter portion of the head that they engage and the radially opposite portion of said side wall, and the distance between the portion of the stud extending thru said opening and the walls of said opening being greater than the radial distance between the outermost peripheral portions of said bearing members and the portions of said side wall adjacent the smallest diameter portions of the head such that said stud is free to tilt in said cavity but said bearing member portions will engage said side wall prior to the stud engaging the wall of said opening to limit the degree of tilting movement.

2. The structure set forth in claim 1 wherein said bearing member portions are integrally joined by a reduced thickness flexible wall section.

3. The structure set forth in claim 1 in which said bearing member portions comprise separate annular bearing members.

4. The structure set forth in claim 1 wherein said bearing member portions have annular grooves on the radially outer peripheries thereof and in which said elastomeric compression members comprise rings seated in said grooves.

5. The structure set forth in claim 1 wherein said conical surfaces are disposed at an obtuse angle to one another.

References Cited

UNITED STATES PATENTS

| | | |
|---|---|---|
| 2,288,160 | 6/1942 | Flumerfelt. |
| 2,708,590 | 5/1955 | Latzen. |
| 2,855,232 | 10/1958 | Kozak _____ 287—87 X |
| 3,018,124 | 1/1962 | Flumerfelt. |

FOREIGN PATENTS

| | | |
|---|---|---|
| 1,290,702 | 3/1962 | France. |
| 501,748 | 3/1939 | Great Britain. |
| 779,200 | 7/1957 | Great Britain. |
| 813,044 | 5/1959 | Great Britain. |

CARL W. TOMLIN, *Primary Examiner.*

A. V. KUNDRAT *Assistant Examiner.*